2,521,639

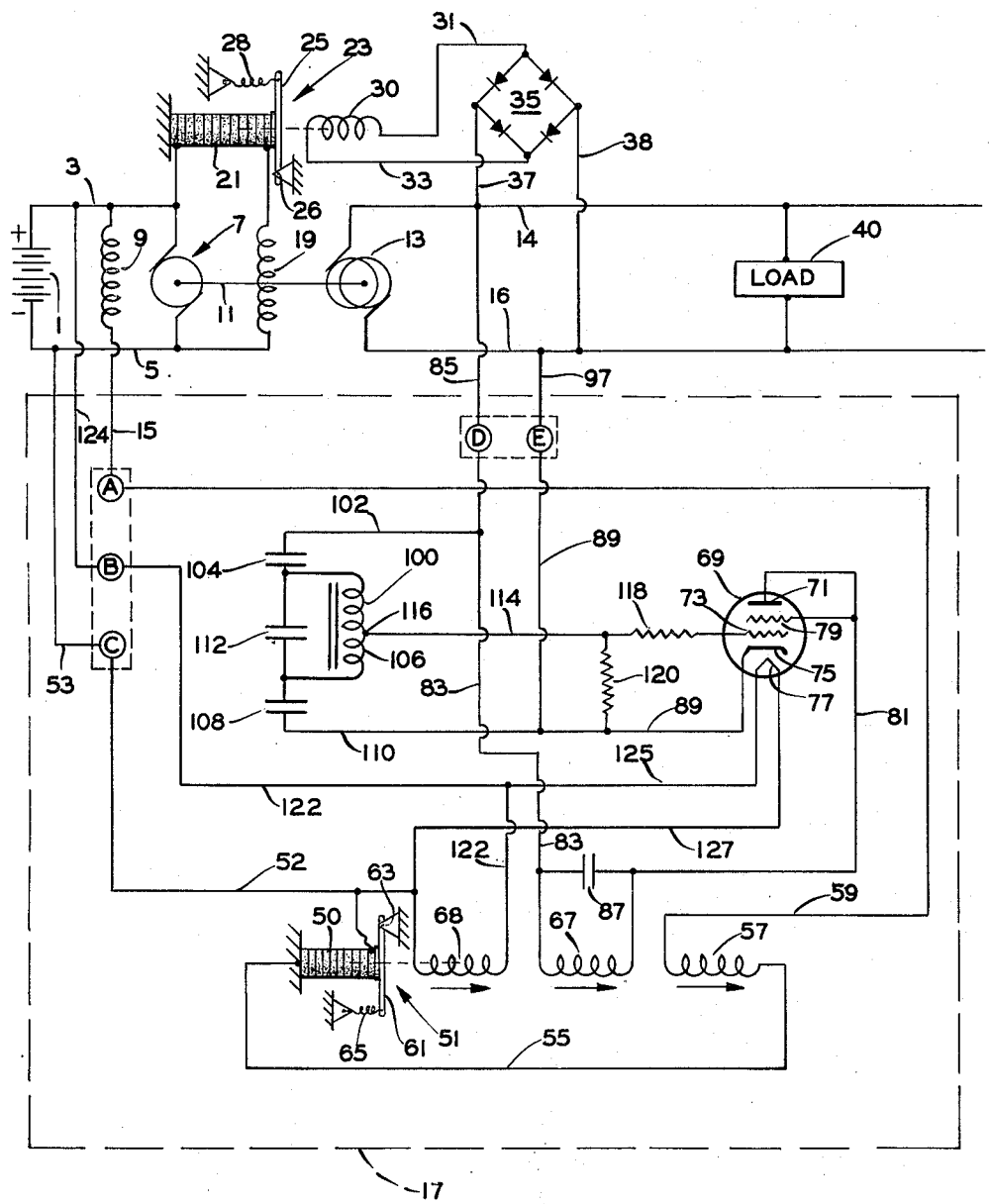
INVENTORS
JOHN W. LAURICELLA
WILLIAM H. STRACENER
BY Herbert L. Davis, Jr.
-ATTORNEY- Patented Sept. 5, 1950

UNITED STATES PATENT OFFICE 2,521,639

FREQUENCY REGULATOR

John W. Lauricella, Passaic, and William H. Stracener, Teaneck, N. J., assignors to Bendix Aviation Corporation, Teterboro, N. J., a corporation of Delaware Application June 25, 1948, Serial No. 35,104

2 Claims. (Cl. 322—32)

The present application relates to a frequency regulator, and more particularly to improvements and simplification of the frequency regulator disclosed and claimed in the copending application Serial No. 783,008, filed October 30, 1947 by John F. Emerson and assigned to Bendix Aviation Corporation.

Heretofore, accurate regulation of the frequency output of a motor driven generator of the type particularly designed for aircraft use has been both desirable and elusive from the standpoint of a practical solution.

Use of a resonant circuit as the frequency sensitive portion of a frequency regulator is not new, but has heretofore in general left much to be desired. For instance, if the current through a resonant circuit is rectified and used directly as motor field current the large amount of D. C. power required would give poor frequency response due to the low Q (ratio of reactance/resistance) and hence the resonant circuit would require large capacity and inductance volt ampere ratings in order to improve the Q. Since the Q of the resonant circuit cannot be above a limiting value, because of the excessive voltages and currents developed at resonance, its frequency sensitivity is limited.

As disclosed herein, by feeding the output of a resonant circuit into a vacuum tube which in turn operates a carbon pile regulator controlling the motor field current, the power drain on the resonant circuit is reduced to a minimum, and small size reactance elements can be used with suitable value of Q.

By providing a capacitor to shunt the inductance of a series resonant circuit, as disclosed herein, the grid and plate voltages of the vacuum tube can be brought into phase below resonance and out of phase above resonance of the series resonant circuit by proper choice of the circuit parameters. Thus, there may be provided in effect a broadly tuned circuit at frequencies below the control point on predetermined operating frequency, but having a sharp slope characteristic which is just above resonance in the control region. This steep slope of the frequency versus plate current curve just above resonance is desirable because it provides many times the control effect for one percent change in frequency than that given by a one percent change in A. C. line voltage.

It should be noted, however, that in the disclosed arrangement in starting, either with or without the vacuum tube at operating temperatures, full field current is applied to the motor to limit the speed thereof.

This full field current is held until the filament of the tube has heated to operating temperature and until the speed of the motor-alternator is such that its output voltage causes enough plate current to flow to cause the carbon pile resistance to increase, decreasing the motor-field current, which, in turn, speeds up the motor until resonant frequency of the control circuit is exceeded, whereupon there is a sharp decrease in the regulating current with increase in frequency until the desired operating frequency is attained. At this point the plate current is dropping rapidly with increasing frequency and the carbon pile is decreasing in resistance, increasing the motor field current and preventing the motor from further increasing in speed.

Use in the regulator of a compensating winding connected in series with the motor field and arranged to aid the main control winding allows high frequency sensitivity with good stability.

An additional winding aiding the main control winding and connected across the D. C. supply line for the filament of the vacuum tube reduces the ampere turns required in the main control winding of the regulator.

An object of the invention, therefore, is to provide a novel regulator of the carbon pile type having an auxiliary electromagnetic winding or coil for applying a biasing force to the armature of the carbon pile regulator to reduce the ampere turns required in a main control winding and thereby increase the sensitivity of the main control winding.

Another object of the invention is to provide a frequency regulator for a motor-generator in which there is provided a frequency sensitive series resonant circuit so selected as to resonate at a frequency slightly less than a predetermined desired operating frequency of the generator and a parallel resonant circuit so selected as to resonate at a frequency slightly greater than the operating frequency, and sufficiently close thereto as to give a characteristic sharp frequency response at frequencies slightly above or below the predetermined operating frequency so as to affect a control grid of an electronic valve and thereby regulate the energization of a control winding of a variable resistance element so as to maintain the predetermined operating frequency of the generator.

Another object of the invention is to provide a control circuit which is effectively a series resonant circuit at below the desired operating frequency of a generator and a parallel resonant circuit at above the desired operating frequency.

Another object of the invention is to provide a control circuit adapted to be connected across the output of an A. C. generator and including a condenser, an inductance and a second condenser connected in series and resonant at a frequency less than the desired or operating frequency of the generator and a third condenser connected across the inductance which causes in effect at frequencies in excess of resonance of the series circuit a shunting of the inductance so that the voltage applied across the plate and cathode through the series connected capacitors is less than and is approximately 180° out of phase with the voltage applied across the grid and cathode, and grid and plate through the series connected capacitor and inductance so as to cause a sharp change in the regulating current upon change in the output frequency of the generator to either side of the desired or operating frequency of the generator.

The above and other objects and features of the invention will appear more fully hereinafter from a consideration of the following description taken in connection with the accompanying drawing wherein one embodiment of the invention is illustrated by way of example.

Referring now in detail to the single figure of the accompanying drawing, in which there is shown a schematic wiring diagram of an embodiment of my invention, the numeral 1 indicates a source of direct current such as a battery connected through conductors 3 and 5 to the armature of a D. C. motor, indicated generally by the numeral 7 and having a shunt field winding 9 of conventional type. The motor 7 drives through shaft 11 an alternator or generator indicated generally by the numeral 13 and having output lines 14 and 16.

The shunt field winding 9 of the motor 7 is connected at one end to the conductor 3, while the opposite end of the field winding 9 is connected by a conductor 15 to a connector post A of a frequency regulator indicated generally by the numeral 17 and which will be explained in greater detail hereinafter.

The alternator 13 has a field winding 19 one end of which is connected to the conductor 5, while the opposite end is connected to one end of a variable resistance element or carbon pile 21 of a voltage regulator of conventional type indicated generally by the numeral 23. The opposite end of the carbon pile 21 is connected to conductor 3 leading to the source of electrical energy 1. Thus, the source of electrical energy is connected through the carbon pile 21 to the field winding 19 of the alternator 13.

The voltage regulator 23 is shown diagrammatically as including an armature 25 pivoted at 26 and biased under tension of a spring 28 in a direction tending to decrease the resistance of the pile 21 and increase the energization of the field winding 19 so as to effect an increase in the voltage output of the alternator 13. An electromagnetic winding or coil 30 biases the armature 25 in a direction opposing the spring 28 and tending to increase the resistance of the carbon pile 21 so as to decrease the energization of the field winding 19 and thereby decrease the output voltage of the alternator 13.

The control coil 30 is connected by lines 31 and 33 to the output of a rectifier 35 of conventional type and having input lines 37 and 38 connected to the output lines 14 and 16 of the alternator 13. It will be seen from the foregoing that the voltage regulator 23 regulates the field winding 19 of the alternator 13 so as to maintain a substantially constant voltage across the lines 14 and 16 which lead to a load indicated schematically by the numeral 40.

Upon change in the load 40 across the output lines of the alternator 13 the output voltage will tend to change together with the speed of motor 7 bringing into operation the novel frequency regulator indicated generally by the numeral 17.

*Frequency regulator circuit*

The frequency regulator circuit includes a variable resistance carbon pile element 50 of a regulator 51. One end of the resistance 50 is connected by a conductor 52 to a connector post C from which there leads a conductor 53 to the conductor 5 and thereby to the source of electrical energy 1. The opposite end of the carbon pile element 50 is connected by a conductor 55 to one end of a compensating winding 57. The opposite end of the compensating winding is connected through a conductor 59 to the connector post A which is connected to the motor field winding 9 through conductor 15.

The regulator 51, described and claimed in divisional application Serial No. 139,756, filed January 20, 1950, is shown diagrammatically as including an armature 61 pivoted at 63 and biased under tension of a spring 65 in a direction tending to decrease the resistance of the carbon pile element 50. Carried by the regulator 51 are three windings or coils, including the compensating winding 57, a main control winding 67 and a novel auxiliary winding 68. All of these windings or coils act in aiding relation one to the other and, in normal operation, the accumulative effect of the windings tends to bias the armature 61 in a direction opposing the spring 65 and tending to increase the resistance of the carbon pile 63 so as to decrease the energization of the shunt field 9 and thereby increase the speed of the motor 7.

Controlling the energization of the main control winding 67 is a multi-element electronic valve 69. The electronic valve 69 includes a plate or anode element 71, a control grid element 73, a cathode element 75, a heater element 77 and a shield grid 79. The plate element 71 and shield grid 79 are connected by conductor 81 to one end of the main control winding 67.

The opposite end of the main control winding 67 is connected by a conductor 83 to a connector post D from which leads a conductor 85 to the output line 14 of the alternator 13. A capacitor 87 is shunted across the main control winding 67 so as to reduce the effective load impedance in the plate circuit and store energy during the effective half-waves to smooth out current pulsations in the main control winding 67. The cathode element 75 of the electronic valve 69 is connected by a conductor 89 to the connector post E from which leads the conductor 97 to the output line 16 of the alternator 13.

Also connected across the conductors 83 and 89 leading from the output of the alternator 13 is a control circuit 100 including a conductor 102 leading from conductor 83, a capacitor 104, inductance 106, capacitor 108 and a conductor 110 leading to conductor 89 and forming a series resonant circuit. Shunted across the inductance 106 is a capacitor 112 forming with inductance 106 a parallel resonant circuit.

The conductors 102 and 110 lead from the conductors 83 and 89 respectively and connect the control circuit 100 across the output lines 14 and 16 of the alternator 13. A conductor 114 leads from an output tap 116 in inductance 106 through resistor 118 to the control grid 73 of the electronic valve 69. The resistor 118 serves to limit the grid current to a safe value.

Connected across the conductors 89 and 114 is a further resistance element 120 which provides a D. C. return for the grid current and with resistor 118 serves to provide proper phasing of grid potential relative to plate potential.

It will be seen from the foregoing that the plate 71 of the electronic valve 69 is fed with raw A. C. through the main control coil 67 so that the electronic valve 69 functions as an A. C. power half-wave rectifier and as a frequency responsive regulating device, since the output of the control circuit 100 is fed directly to the control grid 73 of the electronic valve 69 by conductor 114.

A further novel feature, described and claimed in divisional application Serial No. 139,756, filed January 20, 1950, is the arrangement of the auxiliary coil 68 one end of which is connected through conductors 52, 53 and 5 to one terminal of the source of electrical energy 1, while the opposite end of the auxiliary winding 68 is connected by a conductor 122 to connector post B and through the conductor 124 to conductor 3 and the opposite terminal of the source of electrical energy 1.

Shunted across the conductors 52 and 122 through conductors 125 and 127 is the heater element 77. The armature 61 under the biasing force of spring 65 tends to hold the pile 50 in its fully compressed position so that full field current is applied to the motor field 9 limiting the speed of the motor until the filament 77 has reached its operating condition and sufficient current is passed to the main control winding 67 to decrease the resistance thereof.

The winding 68 aids the main control winding 67 and reduces the ampere turns required in the main control coil 67. Thus, the ampere turns of the main control winding 67 is materially reduced causing a corresponding increase in the sensitivity of the main control coil 67 to changes in frequency as reflected through the electronic valve 69.

The resonant frequency of the series resonant circuit is designed so as to be somewhat less than the desired or regulated operating frequency or speed of the motor driven generator 13. Further, the shunting capacitor 112 is so selected that at frequencies in excess of the resonant frequency of the series circuit the voltage applied to the plate and cathode from across the series connected capacitors 108, 112 and 104 is less than that applied through output tap 116 by the inductance 106 and capacitor 108 across the cathode and grid, or by the inductance 106 and capacitor 104 across the grid and plate and is out of phase therewith by approximately 180° so that the grid 73 is so biased as to effect a sharp decrease in the plate current at the frequencies just above resonance and in the control region. This steep slope of the frequency versus plate current curve is desirable because it provides a greater control effect for change in frequency. Thus, upon changes in the frequency to one side or other of the desired operating frequency of the generator 13, a sharp regulator effect is produced tending to adjust the carbon pile 50 so as to bring the speed of the motor 7 back to the desired operating value.

In other words, the series resonant circuit including capacitor 104, inductance 106, and capacitor 108 is so selected that it will resonate at a frequency slightly less than the desired operating frequency of the generator, moreover the capacitor 112 of the parallel resonant circuit is selected of such a value that the parallel resonant circuit will resonate at a frequency slightly greater than the desired operating frequency of the generator, but sufficiently close as to give a sharp characteristic or frequency response at frequencies slightly above or below the desired operating frequency for which the regulator is set to maintain.

Thus the control circuit 100 is effectively a series resonant circuit at below the desired operating frequency and a parallel resonant circuit at frequencies above the desired operating frequencies.

The energization of the main control winding 67 is regulated through the electronic valve 69 and the highly sensitive winding 67 is stabilized by the compensating winding 57. A decrease in the energization of winding 67 tending to decrease resistance 50 will cause a corresponding increase in the energization of the compensating winding 57 which will tend to retard further change in the resistance of the carbon pile 50 so as to provide stability in the control. Likewise, an increase in the energization of the winding 67 tending to increase the resistance of the carbon pile 50 will decrease the energization of the compensating winding 57 so as to tend to retard further increase in the resistance of the pile 50.

Thus, the compensating winding 57 provides stability in the regulator, while the arrangement of the auxiliary winding 68 in relation to the winding 67 permits fewer turns in the winding 67 than would otherwise be necessary so that the winding 67 may have greater sensitivity to changes in the plate current so as to provide the regulator with high frequency sensitivity.

Although only one embodiment of the invention has been illustrated and described, various changes in the form and relative arrangements of the parts may be made to suit requirements.

What is claimed is:

1. For use with a variable speed generator having a pulsating output current, the frequency of which varies with the speed of the generator, the combination comprising an electronic valve including an anode, a cathode and a control grid; a series tuned circuit including a first capacitor, a second capacitor, and an inductance serially connecting the first and second capacitors; a second parallel tuned circuit including a third capacitor connected in shunt relation to said inductance, said series tuned circuit connected across the anode and cathode of said electronic valve, said inductance tapped at a point intermediate its opposite ends, a conductor leading from said tapped point directly to the control grid, connecting means adapted to connect said anode and cathode across the output of said generator, said connecting means including an electromagnetic winding to regulate the speed of said generator to a predetermined operating frequency in response to electronic flow from the cathode to the anode, said series tuned circuit having a resonant frequency slightly less than said operating frequency, and said parallel tuned circuit having a resonant frequency slightly greater than said operating frequency so as to effect a sharp response in said winding upon application of the output current to said tuned circuits at frequencies above or below the operating frequency and within the range limited by the resonant frequencies of said series and parallel tuned circuits respectively.

2. The combination defined by claim 1 including a variable resistance carbon pile element operated by the first mentioned winding to regulate the frequency of said generator, and an auxiliary electromagnetic winding to apply a constant biasing force to augment the biasing force of said first mentioned winding, and said first winding highly sensitive to changes in electronic flow from said cathode to said anode.

JOHN W. LAURICELLA.
WILLIAM H. STRACENER.

REFERENCES CITED

The following references are of record in the file of this patent:

UNITED STATES PATENTS

| Number | Name | Date |
|---|---|---|
| 2,001,557 | Von Ohlsen | May 14, 1935 |
| 2,036,488 | Moore | Apr. 7, 1936 |